United States Patent
Ito et al.

(10) Patent No.: US 7,439,203 B2
(45) Date of Patent: Oct. 21, 2008

(54) ELECTRONIC DEVICE, DIELECTRIC CERAMIC COMPOSITION AND THE PRODUCTION METHOD

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 156 days.

(21) Appl. No.: 11/390,121

(22) Filed: Mar. 28, 2006

(65) Prior Publication Data

US 2006/0223692 A1    Oct. 5, 2006

(30) Foreign Application Priority Data

Apr. 4, 2005    (JP) .............................. 2005-107842

(51) Int. Cl.
  *C04B 35/468*    (2006.01)
  *H01G 4/06*    (2006.01)
(52) U.S. Cl. ..................... 501/139; 361/321.4; 428/404
(58) Field of Classification Search ................. 501/139; 428/403, 404; 361/321.4
  See application file for complete search history.

(56) References Cited

U.S. PATENT DOCUMENTS

| 5,977,006 | A | * | 11/1999 | Iguchi et al. ................. 501/137 |
| 6,344,427 | B1 | | 2/2002 | Komatsu et al. |
| 6,437,969 | B2 | * | 8/2002 | Mizuno et al. ............... 361/311 |
| 6,556,423 | B2 | * | 4/2003 | Konaka et al. ............ 361/321.2 |
| 6,656,590 | B2 | * | 12/2003 | Venigalla et al. ............. 428/403 |
| 6,721,167 | B2 | * | 4/2004 | Chazono et al. .......... 361/321.2 |
| 6,939,822 | B2 | * | 9/2005 | Konaka et al. ............... 501/137 |
| 2003/0125193 | A1 | | 7/2003 | Kobayashi et al. |

FOREIGN PATENT DOCUMENTS

| DE | 199 18 091 A1 | 10/2000 |
| EP | 1 095 917 A1 | 5/2001 |
| EP | 1 262 467 A1 | 12/2002 |
| JP | 7330427 | * 12/1995 |
| JP | A-2001-220225 | 8/2001 |
| JP | B2-3341003 | 8/2002 |
| JP | B2-3348081 | 9/2002 |

* cited by examiner

*Primary Examiner*—Karl E Group
(74) *Attorney, Agent, or Firm*—Oliff & Berridge, PLC

(57) ABSTRACT

A dielectric ceramic composition comprising a main component including barium titanate and an oxide of Al, wherein the dielectric ceramic composition includes a plurality of dielectric particles, concentration of Al in each of the dielectric particles becomes lower from a particle surface to inside thereof, and each of the dielectric particles has an Al non-dispersed region substantially not including Al at least at a center portion of the particle.

9 Claims, 10 Drawing Sheets

ELECTRONIC DEVICE, DIELECTRIC CERAMIC COMPOSITION AND THE PRODUCTION METHOD

BACKGROUND OF THE INVENTION

1. Field of the Invention

The present invention relates to a dielectric ceramic composition having reduction resistance and an electronic device, such as a multilayer ceramic capacitor, using the dielectric ceramic composition.

2. Description of the Related Art

A multilayer ceramic capacitor as an electronic device is widely used as a highly reliable compact electronic device having a large capacity and by a large number in one electronic apparatus. In recent years, as the apparatuses become more compact and higher in performance, demands for a multilayer ceramic capacitor to be more compact with a larger capacity, low at cost and higher in reliability have become still stronger.

A multilayer ceramic capacitor is normally produced by using internal electrode layer paste and dielectric layer paste, stacking them by using a sheet method or a printing method, etc. and co-firing internal electrode layers and dielectric layers in an obtained stacked body. As a conductive material of the internal electrode layers, Pd and a Pd alloy are generally used, but due to the high price thereof, relatively inexpensive base metals, such as Ni and a Ni alloy, have come to be used. When using a base metal as a conductive material of internal electrode layers, the internal electrode layers are oxidized when fired in the air. Therefore, co-firing of the dielectric layers and internal electrode layers has to be performed in a reducing atmosphere. However, when fired in a reducing atmosphere, the dielectric layers are reduced and the specific resistance declines. Thus, reduction-resistant dielectric materials have been developed.

However, a multilayer ceramic capacitor using a reduction-resistant dielectric material has disadvantages that a decline of IR (insulation resistance) is remarkable when an electric field is applied, the IR lifetime is short and the reliability is low.

Capacitors are also required to have preferable temperature characteristics and, particularly, required to have a flat temperature characteristic under a severe condition depending on the use object. In recent years, multilayer ceramic capacitors have come to be used in a variety of electronic apparatuses, such as an engine electronic control unit (ECU) to be installed in an engine room of vehicles, a crank angle sensor and an Anti Lock Brake System (ABS) module. Since these electronic apparatuses are for stable engine controlling, drive controlling and brake controlling, preferable temperature stability of the circuit is required.

Environments of using the electronic apparatuses are expected to become about −20° C. or lower in winter in cold climates and about +130° C. or higher after the engine starts in summer. Recently, there is a tendency of reducing a wire harness for connecting the electronic apparatus and an apparatus to be controlled thereby and the electronic apparatus may be provided outside of a vehicle, therefore, environments for the electronic apparatuses have been getting more severe. Accordingly, a capacitor used by the electronic apparatuses is required to have a high specific permittivity and excellent capacity-temperature characteristics.

On the other hand, to improve the capacity-temperature characteristics while maintaining a high specific permittivity, the present applicants have already proposed a dielectric ceramic composition described below (The Japanese Patent Publication No. 3348081 and The Japanese Patent Publication No. 3341003). Particularly, according to The Japanese Patent Publication No. 3348081 and The Japanese Patent Publication No. 3341003, it became possible that the capacity-temperature characteristics satisfy the X8R characteristics (−55 to 150° C. and $\Delta C/C$=within ±15%) of the EIA standard.

However, the dielectric ceramic compositions in The Japanese Patent Publication No. 3348081 and The Japanese Patent Publication No. 3341003 had disadvantages that the TC bias characteristics (capacity-temperature characteristics when applied with a direct-current voltage) were poor and the IR temperature dependency from the room temperature to a high temperature part was poor, so that the practical use as a product sometimes became difficult.

SUMMARY OF THE INVENTION

The present invention was made in consideration of the above circumstances and the object of the present invention is to provide a dielectric ceramic composition wherein a high specific permittivity and preferable temperature characteristics are maintained and, furthermore, TC bias characteristics and IR temperature dependency are improved. Another object of the present invention is to provide an electronic device, such as a multilayer ceramic capacitor, using the dielectric ceramic composition as above, realizing a compact body with a larger capacity and, particularly, capable of being made compact with thinner layers.

The present inventors found that TC bias characteristics and IR temperature dependency could be improved while maintaining a specific permittivity and capacitor-temperature characteristics by configuring dielectric particles included in a dielectric ceramic composition that Al concentration gradually becomes lower from the particle surface to inside of the particle and, based on the knowledge, attained the present invention.

Namely, according to the present invention, there is provided a dielectric ceramic composition comprising a main component including barium titanate and an oxide of Al, wherein:

the dielectric ceramic composition includes a plurality of dielectric particles; and concentration of Al in each of the dielectric particles becomes lower from a particle surface to inside thereof.

In the present invention, preferably, each of the dielectric particles has an Al non-dispersed region substantially not including Al at least at a center portion of the particle.

By forming an Al non-dispersed region not including Al at the center of each particle, deterioration of the capacitor-temperature characteristics can be prevented efficiently. Note that, in the present invention, "substantially not including Al" means a state that a rate of content of Al in dielectric particles is less than 10 ppm in weight ratio. Also, "the center portion of a particle" dose not have to be the exact center of the particle and may be approximate center.

Preferably, each of the dielectric particles has Al dispersed region substantially including Al dispersing from the particle surface to inside thereof; and when assuming that a particle diameter of the dielectric particle is D, a depth $T_{Al}$ of the Al dispersed region from the particle surface is 5 to 45% and, more preferably, 20 to 40% of the particle diameter D.

The Al dispersed region is a region substantially including Al in the dielectric particle, and the Al dispersed region spreads from the dielectric particle surface to inside of the particle. When a depth $T_{Al}$ of the Al dispersed region is too shallow, the effect of the present invention is hard to be obtained and TC bias characteristics tend to decline. While, when too deep, Al is included close to the center portion of the particle, so that the capacitor-temperature characteristics tends to decline. Note that the depth $T_{Al}$ being 50% of the particle diameter D means that Al is dispersed to the center portion of the particle. Namely, the particle center portion substantially includes Al.

Preferably, the dielectric ceramic composition has a plurality of the dielectric particles and crystal grain boundaries existing between the dielectric particles next to each other; and a rate of Al content at a depth $T_5$ as a depth from the particle surface being 5% of the particle diameter D is 20 to 80%, more preferably 20 to 60%, and furthermore preferably 35 to 50% when a rate of Al content at the crystal grain boundaries is 100%.

Preferably, a content of an oxide of the Al is 0 to 4.0 moles (note that 0 is not included) and, more preferably, 1.0 to 2.0 moles with respect to 100 moles of the main component in terms of $Al_2O_3$.

Preferably, the dielectric ceramic composition furthermore comprises:

a first subcomponent including at least one kind selected from MgO, CaO, BaO, SrO and $Cr_2O_3$;

a second subcomponent including oxide silicon as a main component;

a third subcomponent including at least one kind selected from $V_2O_5$, $MoO_3$ and $WO_3$;

a fifth subcomponent including $CaZrO_3$ or $CaO+ZrO_2$;

a sixth subcomponent including an oxide of R2 (note that R2 is at least one kind selected from Y, Dy, Ho, Tb, Gd and Eu); and a seventh subcomponent including MnO;

wherein ratios of the respective subcomponents with respect to 100 moles of the main component are first subcomponent: 0.1 to 3 moles, second subcomponent: 2 to 10 moles, third subcomponent: 0.01 to 0.5 mole, fifth subcomponent: larger than 0 mole but not larger than 5 moles, sixth subcomponent: larger than 0 mole but not larger than 9 moles (note that number of moles of the sixth subcomponent is a rate in terms of an R2 element), and seventh subcomponent: larger than 0 mole but not larger than 0.5 mole.

In the present invention, by including the first to third and fifth to seventh subcomponents in addition to barium titanate and an Al oxide, the capacitor-temperature characteristics can be improved and, for example, the X7R characteristics of the EIA standard (−55 to 125° C. and ΔC/C=within ±15%) can be satisfied.

Preferably, the dielectric ceramic composition furthermore comprises a fourth subcomponent including an oxide of R1 (note that R1 is at least one kind selected from Sc, Er, Tm, Yb and Lu);

wherein a content of the fourth subcomponent is 0.5 to 7 moles with respect to 100 moles of the main component in terms of an R1 element.

In the present invention, as a result that the dielectric ceramic composition furthermore includes a fourth subcomponent including the R1 oxide in addition to the first to third and fifth to seventh subcomponents, the capacitor-temperature characteristics can be furthermore improved and, for example, the X8R characteristics of the EIA standard (−55 to 150° C. and ΔC/C=within ±15%) can be satisfied.

According to the present invention, there is provided a production method of the dielectric ceramic composition as above, comprising a step of performing calcining on a main component and at least a part of an oxide of Al to be included in the dielectric ceramic composition.

An electronic device according to the present invention comprises a dielectric layer composed of the dielectric ceramic composition of the present invention as above. The electronic device is not particularly limited and a multilayer ceramic capacitor, piezoelectric device, chip inductor, chip varistor, chip thermistor, chip resistor, and other surface mounted chip electronic devices (SMD) may be mentioned.

A multilayer ceramic capacitor according to the present invention is configured by alternately stacking dielectric layers formed by the dielectric ceramic composition of the present invention as above and internal electrode layers.

According to the present invention, since dielectric particles included in the dielectric ceramic composition are configured that Al concentration gradually becomes lower from the particle surface to inside thereof, so that it is possible to provide a dielectric ceramic composition having improved TC bias characteristics and IR temperature dependency while maintaining the permittivity and capacitor-temperature characteristics, and the production method. Also, according to the present invention, by using the dielectric ceramic composition as dielectric layers of an electronic device, such as a multilayer ceramic capacitor, it is possible to provide a multilayer ceramic capacitor or other electronic device having the above characteristics, capable of realizing a compact body with a large capacity and, particularly, capable of attaining a compact body with thin layers.

Note that, in the present invention, "IR temperature dependency" is an index for assessing how insulation resistance IR changes against temperature changes. The IR temperature dependency can be evaluated by calculating a rate (change rate) of IR at a predetermined temperature (for example, at 125° C. or 150° C.) changed from IR at a reference temperature (for example, at the room temperature of 25° C.). It is determined that the smaller an IR change rate between a plurality of temperatures is, the superior the IR temperature dependency is; while the larger the rate is, the poorer the IR temperature dependency is.

For example, even if the capacitor-temperature characteristics satisfy the X7R characteristics or X8R characteristics of the EIA standard, when the IR temperature dependency in these temperature ranges (particularly, from the room temperature to a high temperature range) is poor, reliability particularly in the high temperature range declines and a practical use thereof as a product becomes difficult. Therefore, to have excellent IR temperature dependency is a significant index for determining whether the capacitor can be used stably in a high temperature range.

In the present invention, for example, the room temperature (25° C.) and a high temperature portion (150°) are used as examples of the plurality of temperatures, and when assuming that insulation resistance at the respective temperatures are $IR_{25}$ and $IR_{150}$, the IR temperature dependency is evaluated to be good or bad by calculating a value of "a loss of significant digits of IR" expressed by the formula (1) below.

$$\log(IR_{150}/IR_{25}) \tag{1}$$

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

First Embodiment

Figure 1:
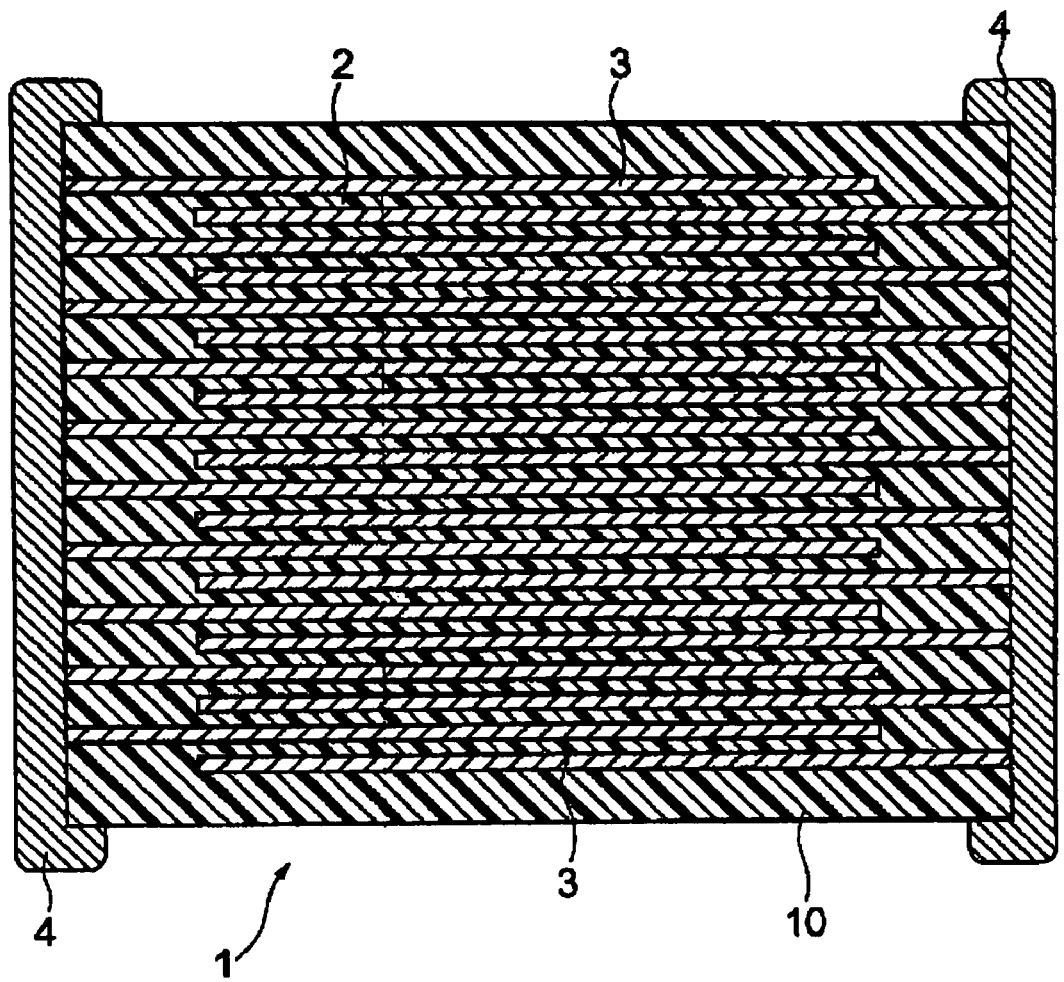
FIG. 1 is a sectional view of a multilayer ceramic capacitor according to an embodiment of the present invention.

As shown in FIG. 1, a multilayer ceramic capacitor 1 as an electronic device according to an embodiment of the present invention has a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

A shape and size of the capacitor element body 10 are not particularly limited and may be suitably set in accordance with the use object, but is normally rectangular parallelepiped and the size may be normally a length (0.4 to 5.6 mm)×width (0.2 to 5.0 mm)×height (0.2 to 1.9 mm) or so.

Dielectric Layer 2

The dielectric layers 2 include the dielectric ceramic composition of the present invention.

The dielectric ceramic composition according to the present invention comprises a main component including barium titanate (preferably, expressed by $Ba_mTiO_{2+m}$, wherein m satisfies $0.995 \leq m \leq 1.010$ and a ratio of Ba and Ti satisfies $0.995 \leq Ba/Ti \leq 1.010$) and an oxide of Al.

A content of the Al oxide is preferably 0 to 4.0 moles (note that 0 is not included) and more preferably 1.0 to 2.0 moles in terms of $Al_2O_3$ with respect to 100 moles of the main component. The Al oxide has an effect of improving sinterability of the dielectric ceramic composition. When a content of the Al oxide is too large, the high temperature load lifetime tends to decline. On the other hand, when the Al oxide is not added, sinterability of the dielectric ceramic composition declines and sintering becomes difficult.

In the present embodiment, at least a part of the Al oxide is solid dispersed in dielectric particles composing the dielectric ceramic composition and, moreover, it is configured that a rate of content (concentration) of the Al oxide becomes lower from the particle surface to inside thereof in the dielectric particle. Note that this will be explained in detail later on.

The dielectric ceramic composition composing the dielectric layers 2 furthermore comprises subcomponents (first to third and fifth to seventh subcomponents) below in addition to the main component and the Al oxide explained above.

Namely, a first subcomponent including at least one kind selected from MgO, CaO, BaO, SrO and $Cr_2O_3$;

a second subcomponent including oxide silicon as a main component;

a third subcomponent including at least one kind selected from $V_2O_5$, $MoO_3$ and $WO_3$;

a fifth subcomponent including $CaZrO_3$ or $CaO+ZrO_2$;

a sixth subcomponent including an oxide of R2 (note that R2 is at least one kind selected from Y, Dy, Ho, Tb, Gd and Eu); and a seventh subcomponent including MnO are furthermore included.

Contents of the first to third and fifth to seventh subcomponents with respect to 100 moles of the main component are preferably first subcomponent: 0.1 to 3 moles,
second subcomponent: 2 to 10 moles,
third subcomponent: 0.01 to 0.5 mole,
fifth subcomponent: larger than 0 mole but not larger than 5 moles,
sixth subcomponent: larger than 0 mole but not larger than 9 moles, and
seventh subcomponent: larger than 0 mole but not larger than 0.5 mole;

and more preferably, first subcomponent: 0.5 to 2.5 moles,
second subcomponent: 2.0 to 5.0 moles,
third subcomponent: 0.01 to 0.4 mole,
fifth subcomponent: 0.5 to 3 moles,
sixth subcomponent: 0.5 to 9 moles, and
seventh subcomponent: 0.01 to 0.5 mole.

Note that above ratios of the sixth subcomponent are not mole ratios of an oxide of R2 but mole ratios of an R2 element alone. Namely, for example, when using an oxide of Y as the sixth subcomponent, a ratio of the sixth subcomponent being 1 mole does not mean that a ratio of $Y_2O_3$ is 1 mole, but a ratio of Y is 1 mole.

Also, in this specification, the respective oxides composing the main component and the subcomponents are expressed by stoichiometric compositions, but an oxidation state of each oxide may be deviated from the stoichiometric composition. Note that the above ratios of the subcomponents are obtained by converting a metal amount contained in an oxide composing each subcomponent to the oxide having the above stoichiometric composition.

By including the first to third and fifth to seventh subcomponents, the X7R characteristics can be satisfied while maintaining a high permittivity. Preferable contents of the first to third and fifth to seventh subcomponents are as described above, and reasons thereof are explained below.

The first subcomponent (MgO, CaO, BaO SrO and $Cr_2O_3$) exhibits an effect of flattening the capacity-temperature characteristics. When a content of the first subcomponent is too small, the capacity temperature change rate may become large. While, when the content is too much, sinterability may be deteriorated. Note that component ratios of the oxides in the first subcomponent may be any.

The second subcomponent (including oxide silicon as the main component) serves mainly as a sintering auxiliary and exhibits an effect of improving a defective rate of initial insulation resistance when forming a thinner layer. When a content of the second subcomponent is too small, the capacitor-temperature characteristics decline and the IR (insulation resistance) declines. On the other hand, when the content is too large, the IR lifetime becomes insufficient and an abrupt decline of the permittivity arises.

The third subcomponent ($V_2O_5$, $MoO_3$ and $WO_3$) exhibits an effect of flattening the capacity-temperature characteristics at the Curie's temperature or higher and an effect of improving the IR lifetime. When a content of the third subcomponent is too small, these effects become insufficient. While when the content is too large, the IR declines remarkably. Note that containing ratio of the oxides in the third subcomponent may be any.

The fifth subcomponent ($CaZrO_3$ or $CaO+ZrO_2$) exhibits an effect of shifting the Curie's temperature to the high temperature side and an effect of making the capacitor-temperature characteristics flat. It also gives an effect of improving a CR product and DC dielectric breakdown strength. Note that when a content of the fifth subcomponent is too large, the IR accelerated lifetime declines remarkably and the capacitor-temperature characteristics become poor.

The sixth subcomponent (an oxide of R2) exhibits an effect of improving IR and IR lifetime and gives a little adverse effect to the capacitor-temperature characteristics. Note that when a content of the R2 oxide is too large, the sinterability tends to decline. Among the sixth subcomponents, an oxide of Y is preferable for giving a high effect on improving characteristics and a low price thereof.

The seventh subcomponent (MnO) exhibits an effect of accelerating sintering, an effect of heightening IR and an effect of improving the IR lifetime. Note that when a content of the seventh subcomponent is too large, it gives an adverse effect on the capacitor-temperature characteristics, so that 0.5 mole or less is preferable.

Preferably, the second subcomponent is expressed by at least one kind selected from $SiO_2$, MO (note that M is at least one kind of element selected from Ba, Ca, Sr and Mg), $Li_2O$ and $B_2O_3$.

More preferably, the second subcomponent is expressed by $(Ba, Ca)_xSiO_{2+x}$ (note that x=0.7 to 1.2). BaO and CaO in $[(Ba, Ca)_xSiO_{2+x}]$ are also included in the first subcomponent, but $(Ba, Ca)_xSiO_{2+x}$ as a composite oxide has a low melting point, so that reactivity to the main component is preferable. Therefore, BaO and/or CaO may be added as the composite oxide. Note that a ratio of Ba and Ca may be any and only one of them may be included.

A thickness of the dielectric layer 2 is not particularly limited, but preferably 4.5 μm or thinner per one layer, more preferably 3.5 μm or thinner, and furthermore preferably 3.0 μm or thinner. The lower limit of the thickness is not particularly limited, but is, for example, 0.5 μm or so.

The number of stacked layers of the dielectric layers 2 is not particularly limited, but is preferably 20 or larger, more preferably 50 or larger, and particularly preferably 100 or larger. The upper limit of the number of stacked layers is not particularly limited, but is, for example, 2000 or so.

Fine Structure of Dielectric Layer 2

Figure 2:
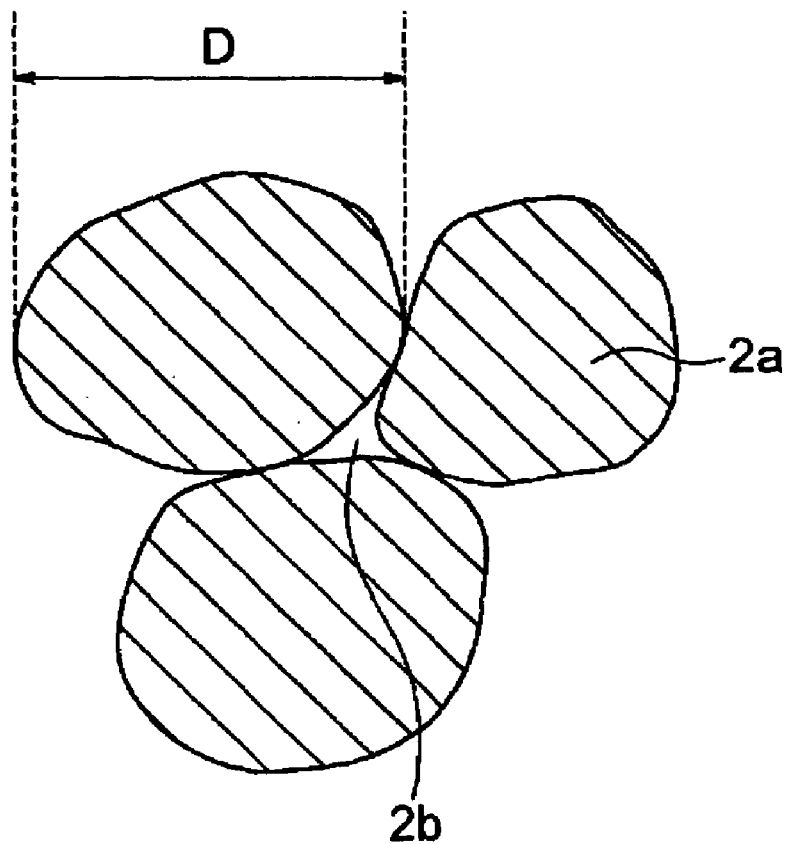
FIG. 2 is an enlarged sectional view of a key part of a dielectric layer 2 shown in FIG. 1.

As shown in FIG. 2, the dielectric layer 2 is configured by including dielectric particles (crystal grains) 2a and crystal grain boundaries (grain boundary phases) 2b formed between a plurality of adjacent dielectric particles 2a. The dielectric particles 2a are particles composed mainly of barium titanate as the main component and the dielectric particles 2a of the present embodiment at least include Al in addition to barium titanate.

In the present embodiment, Al included in the dielectric particles 2a is included in a state that the concentration gradually becomes lower from the particle surface to inside thereof. In the present invention, this is the most significant characteristic. As a result that Al is included in the dielectric particles 2a and concentration of Al in the particles is controlled to be gradually lower, the TC bias characteristics and IR temperature dependency can be improved while maintaining the permittivity and capacitor-temperature characteristics. Below, with reference to FIG. 3 and FIG. 4, a preferable state of the internal particle configuration of the dielectric particle 2a will be explained in detail.

Figure 3:
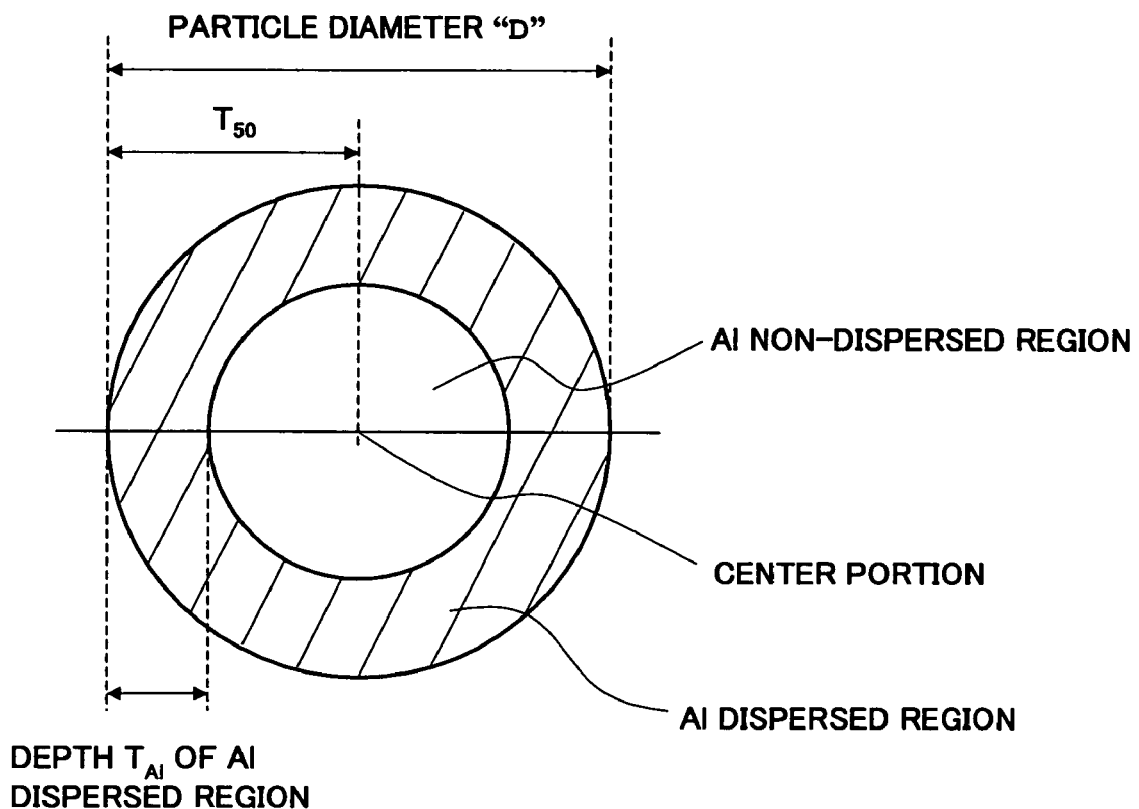
FIG. 3 and FIG. 4 are schematic views for explaining an internal particle configuration of a dielectric particle.

As shown in FIG. 3, the dielectric particle 2a substantially contains Al and, moreover, an Al dispersed region having Al dispersed from the particle surface to inside thereof is formed. The Al dispersed region spreads from the particle surface to a depth $T_{Al}$. When assuming that a length of a particle diameter D of the dielectric particle 2a is 100%, the depth $T_{Al}$ is preferably 5 to 45%, more preferably 20 to 40%, and furthermore preferably 25 to 35%. When the depth $T_{Al}$ of the Al dispersed region is too shallow, the effect of the present invention is hard to be obtained and TC bias characteristics tend to decline. While, when too deep, Al is included close to the particle center portion and the capacitor-temperature characteristics tend to decline. In the present embodiment, a region with a rate of Al content including 10 ppm or larger of Al in weight ratio is considered as the Al dispersed region.

Note that a particle diameter D of the dielectric particle 2a is a value obtained by measuring an area of a section of the dielectric particle 2a shown in FIG. 2, calculating a diameter by assuming as an equivalent circle diameter and multiplied the result with 1.5.

The method of measuring the depth $T_{Al}$ of the Al dispersed region is not particularly limited and it may be measured, for example, by line analysis by TEM. Namely, first, line analysis is performed by TEM on the dielectric particle 2a by using a straight line from end to end of the particle passing through an approximate center of the dielectric particle 2a. Then, line analysis is performed on the same particle by shifting the line by 90 degrees. The results are averaged to be used as the depth.

In the dielectric particle 2a, an Al non-dispersed region substantially not including Al is also formed inside of the depth $T_{Al}$. In the present embodiment, a region wherein a rate of content of Al is less than 10 ppm in weight ratio is considered as the Al non-dispersed region. The Al non-dispersed region is preferably a region including at least the particle center portion shown in FIG. 3. The particle center portion corresponds to a part having a depth from the particle surface of $T_{50}$ which is 50% of the particle diameter D, but it dose not have to be an exact center of the particle and may be an approximate center. In the present embodiment, as a result of the configuration that the Al concentration becomes lower from the particle surface to inside thereof and an Al non-dispersed region substantially not including Al is formed at the particle center, the capacitor-temperature characteristics can be improved.

A method of checking whether an Al non-dispersed region is formed at the particle center portion or not is not particularly limited and it may be checked, for example, by line analysis by TEM in the same way as explained above.

Figure 4:
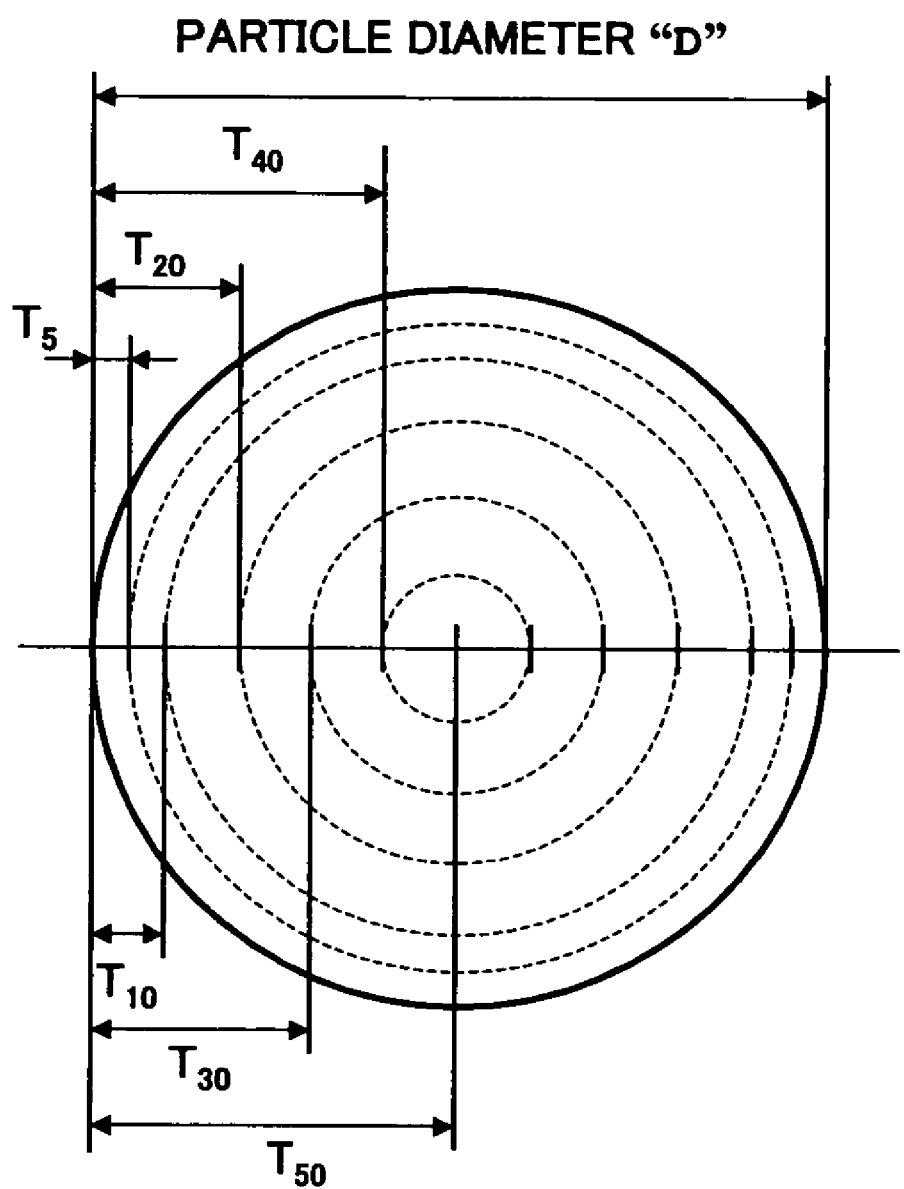

Furthermore, in the present embodiment, a rate of content of Al at depth $T_5$ from the particle surface shown in FIG. 4 is preferably in a predetermined range. Note that the depth $T_5$ means that the depth from the particle surface is 5% of the particle diameter D. Specifically, when assuming that a rate of Al content in the crystal grain boundary $2b$ shown in FIG. 2 is 100%, the rate of Al content at the depth $T_5$ is preferably 20 to 80%, more preferably 20 to 60%, and furthermore preferably 35 to 50%. When a rate of Al content at the depth $T_5$ is too small, the TC bias characteristics tend to decline.

Also, besides the $T_5$, it is more preferable that rates of Al content at depths $T_{10}$, $T_{20}$, $T_{30}$ and $T_{40}$ as depths from the particle surface being 10%, 20%, 30% and 40% of the particle diameter D are in predetermined ranges below. Namely, when assuming that a rate of Al content in the crystal grain boundary $2b$ is 100%, the respective rates are preferably as below.

$T_{10}$: 5 to 30%
$T_{20}$: 3 to 20%
$T_{30}$: 0 to 10%
$T_{40}$: 0 to 3%

Note that it is preferable that a rate of Al content at the depth $T_{50}$ (that is, the center portion) as a depth from the particle surface being 50% of the particle diameter D is substantially 0%. A method of measuring rates of Al content at the respective depths $T_5$, $T_{10}$, $T_{20}$, $T_{30}$, $T_{40}$ and $T_{50}$ is not particularly limited and it may be measured by line analysis by TEM in the same way as explained above.

Internal Electrode Layer 3

A conductive material included in the internal electrode layer 3 is not particularly limited, but since components of the dielectric layer 2 has reduction-resistance, relatively inexpensive base metals may be used. As base metals to be used as the conductive material, Ni or a Ni alloy is preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, in an amount of not more than 0.1 wt % or so. A thickness of the internal electrode layer 3 may be suitably determined in accordance with the use object, etc., but normally it is preferably 0.1 to 3 μm, and particularly 0.2 to 2.0 μm or so.

External Electrode 4

A conductive material included in the external electrode 4 is not particularly limited, but inexpensive Ni, Cu and alloys of these may be used in the present embodiment. A thickness of the external electrode 4 may be suitably determined in accordance with the use object, etc., but it is normally 10 to 50 μm or so.

Production Method of Multilayer Ceramic Capacitor 1

A multilayer ceramic capacitor 1 in the present embodiment is produced by preparing a green chip by a normal printing method or sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is prepared and made to be slurry to fabricate a dielectric layer paste.

The dielectric layer paste may be organic slurry obtained by kneading the dielectric ceramic composition powder with an organic vehicle or water based slurry.

As the dielectric ceramic composition powder, the above oxides, mixtures thereof, and composite oxides may be used, and also it may be suitably selected from a variety of compounds to be the above oxides, and composite oxides by firing, such as carbonate, oxalate, nitrate, hydroxide and organic metal compound, etc., and mixed for use. A content of each compound in the dielectric ceramic composition powder may be determined, so that a composition of the above dielectric ceramic composition after firing is obtained. In a state before being made to be slurry, a particle diameter of the dielectric ceramic composition powder is normally 0.1 to 1 μm or so in the average particle diameter.

Note that, in the present embodiment, when fabricating the dielectric ceramic composition powder as above, it is preferable that barium titanate as the main component and at least a part of an Al oxide to be included in the dielectric layers 2 after sintering are preliminarily fired in advance. By preliminarily firing the main component and Al oxide (or a compound to be the Al oxide by firing) in advance, Al can be well dispersed in dielectric particles $2a$ included in the dielectric layers 2 after sintering.

The calcining temperature is preferably 600° C. or higher and lower than 1000° C., and more preferably 700° C. or higher and 900° C. or lower. By performing the calcining at a high temperature, a rate of Al content in the dielectric particles $2a$ can be high, Al can be dispersed deeper, and the depth $T_{Al}$ of the Al dispersed region can become deep. Note that, when the calcining temperature is too high, Al uniformly disperses in the dielectric particles, and the capacitor-temperature characteristics, TC bias characteristics and IR temperature dependency tend to decline.

The calcining time is preferably 0.5 to 6 hours, and more preferably 2 to 4 hours. When the calcining time is long, a rate of Al content in the dielectric particles $2a$ can be high, Al can be dispersed deeper, and the depth $T_{Al}$ of the Al dispersed region can become deep. Note that when the calcining time is too long, the Al dispersed region spreads to the center portion of the dielectric particle and the capacitor-temperature characteristics, TC bias characteristics and IR temperature dependency tend to decline.

Note that when performing the calcining, other subcomponents may be added in addition to the main component and the Al oxide to perform calcining.

Then, preliminarily fired powder obtained by the calcining is pulverized in accordance with need, added with other materials to attain a desired composition and mixed, so that a dielectric ceramic composition powder can be obtained.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent is not particularly limited and may be suitably selected from a variety of organic solvents, such as terpineol, butyl carbitol, acetone, and toluene, in accordance with a method to be used, such as the printing method and sheet method.

Also, when using water based slurry as dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as the above internal electrode layer paste.

A content of the organic vehicle in the above variety of pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using the printing method, the dielectric layer paste and the internal electrode layer paste are stacked and printed on a substrate, such as PET, cut to be a predetermined shape and removed from the substrate to obtain a green chip.

When using the sheet method, the dielectric layer paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder removal effect declines. While, when the oxygen partial pressure exceeds the above range, the internal electrode layer tends to be oxidized.

Also, as other binder removal conditions, the temperature raising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere at firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-7}$ to $10^{-3}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., and more preferably 1200 to 1300° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-1}$ to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the high temperature load lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the high temperature load lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so. The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

According to the first embodiment, it is possible to obtain a multilayer ceramic capacitor, wherein the capacitor-temperature characteristics satisfy the X7R characteristics and the TC bias characteristics and IR temperature dependency are improved while a high permittivity is maintained.

Second Embodiment

Comparing with the first embodiment, in the second embodiment, a composition of a dielectric ceramic composition composing the dielectric layers 2 is different in points explained below. Other than that, the second embodiment has the same configuration and effects as those in the first embodiment and the duplicate explanation will be omitted.

Namely, in the second embodiment, in addition to the main component, an Al oxide, the first to third and fifth to seventh subcomponent explained in the first embodiment, a fourth subcomponent including an oxide of R1 (note that R1 is at least one kind selected from Sc, Er, Tm, Yb and Lu) is included.

The fourth subcomponent (an oxide of R1) exhibits an effect of shifting the Curie's temperature to the high temperature side and an effect of flattening the capacitor-temperature characteristics. A content of the fourth subcomponent is preferably 0.5 to 7 moles, and more preferably 0.5 to 5.0 moles in terms of an R1 element with respect to 100 moles of the main component. When the content of the fourth subcomponent is too small, the effects become insufficient and the capacitor-temperature characteristics declines. On the other hand, when the content is too large, the sinterability tends to decline. An oxide of Yb is preferable in the fourth subcomponent because of the high effect of improving the characteristics and low price.

Also, in the second embodiment, the total content of the fourth subcomponent and the sixth subcomponent is preferably 13 moles or smaller and more preferably 10 moles or smaller (note that numbers of moles of the fourth subcomponent and the sixth subcomponent are ratios of an R1 element and R2 element alone) with respect to 100 moles of the main component. Due to this, the sinterability can be maintained preferable.

In the second embodiment, the fourth subcomponent is included in addition to the main component, an Al oxide and the first to third and fifth to seventh subcomponents, the capacitor-temperature characteristics can be furthermore improved and, specifically, the X8R characteristics can be satisfied. Moreover, due to the configuration of the dielectric particles included in the dielectric ceramic composition that the Al concentration becomes lower from the particle surface to inside thereof, the TC bias characteristics and IR temperature dependency can be improved.

Embodiments of the present invention was explained above, but the present invention is not at all limited to the above explained first embodiment and second embodiment and may be variously modified within the scope of the present invention.

For example, in the above embodiment, a multilayer ceramic capacitor was taken as an example of an electronic device according to the present invention, but the electronic device according to the present invention is not limited to a multilayer ceramic capacitor and may be any as far as it includes a dielectric layer composed of the dielectric ceramic composition of the present invention.

EXAMPLES

Below, the present invention will be explained based on further detailed examples, but the present invention is not limited to the examples.

Example 1

In the example 1, multilayer ceramic capacitor samples corresponding to the first embodiment (the X7R characteristics) were produced and evaluated.

First, 100 moles of $BaTiO_3$ as a main component material and 2.0 moles of $Al_2O_3$ were prepared. Next, these materials were mixed to obtain powder before calcining, and calcining is performed thereon under the condition below, so as to obtain five different kinds of powders calcined at different temperatures (corresponding to samples 1 to 5 in Table 1).

Calcining temperature: temperatures between 700 and 1000° C.

Calcining time: two hours

Note that the calcining temperatures of the respective samples were 700° C. in a sample 1, 750° C. in a sample 2, 800° C. in a sample 3, 850° C. in a sample 4 and 1000° C. in a sample 5.

Next, the obtained preliminarily fired powders were pulverized, added with subcomponents below, wet mixed by a ball mill for 16 hours and dried to obtain dielectric materials (dielectric ceramic composition powders).

$MgCO_3$ (the first subcomponent): 2.4 moles
$(Ba_{0.6}Ca_{0.4})SiO_3$ (the second subcomponent): 3.0 moles
$V_2O_5$ (the third subcomponent): 0.02 mole
$CaZrO_3$ (the fifth subcomponent): 1.0 mole
$Y_2O_3$ (the sixth subcomponent): 2.0 moles
$MnCO_3$ (the seventh subcomponent): 0.1 mole Note that each adding quantity of the subcomponents above is expressed by number of moles with respect to 100 moles of the main component in terms of each oxide. However an adding quantity of the sixth subcomponent is expressed by number of moles in terms of a Y element not in terms of $Y_2O_3$. Namely, it is 1.0 mole in terms of $Y_2O_3$.

Then, 100 parts by weight of the obtained dielectric material after drying, 4.8 parts by weight of an acrylic resin, 100 parts by weight of ethyl acetate, 6 parts by weight of mineral spirit and 4 parts by weight of toluene were mixed by a ball mill to form paste, so that dielectric layer paste was obtained.

Next, 44.6 parts by weight of Ni particles, 52 parts by weight of terpineol, 3 parts by weight of ethyl cellulose and 0.4 part by weight of benzotriazole were kneaded by a triple-roll to form slurry, so that internal electrode layer paste was obtained.

By using these pastes, the multilayer ceramic chip capacitor shown in FIG. 1 was produced as explained below.

First, by using the obtained dielectric layer paste, a green sheet was formed on a PET film, after printing the internal electrode layer paste thereon, the sheet was removed from the PET film. Next, the green sheets and protective green sheets (not printed with the internal electrode layer paste) were stacked and bonded with pressure to obtain a green chip.

Next, the green chip was cut to a predetermined size and subjected to binder removal processing, firing and annealing under the conditions below, so that a multilayer ceramic sintered body was obtained. The binder removal processing condition was the temperature raising rate of 30° C./hour, the holding temperature of 260° C., the temperature holding time of 8 hours, and the atmosphere of in the air. The firing condition was the temperature raising rate of 200° C./hour, the holding temperature of 1240° C., the temperature holding time of 2 hours, cooling rate of 300° C./hour and the atmosphere of wet mixed gas of $N_2$ and $H_2$ (the oxygen partial pressure was $10^{-2}$ Pa). The annealing condition was the temperature raising rate of 200° C./hour, the holding temperature of 1000° C., the temperature holding time of 2 hours, cooling rate of 300° C./hour and the atmosphere of wet $N_2$ gas (the oxygen partial pressure was $10^{-1}$ Pa). Note that a wetter, wherein the water temperature was 5 to 75° C., was used to wet the atmosphere gas at the time of firing and annealing.

Next, after polishing end surfaces of the obtained multilayer ceramic sintered body by sand blasting, In—Ga was applied as external electrodes, so that samples 1 to 5 of the multilayer ceramic capacitor shown in FIG. 1 were obtained. Note that these samples 1 to 5 are obtained by changing a temperature at calcining in a range of 700 to 1000° C., respectively.

A size of the obtained capacitor samples was 3.2 mm×1.6 mm×0.6 mm, the number of dielectric layers sandwiched by internal electrode layers was 4, a thickness (a thickness between layers) of one dielectric layer was 3.5 μm, and a thickness of one internal electrode layer was 1.0 μm.

Then, a rate of Al content at each depth T ($T_5$, $T_{10}$, $T_{20}$, $T_{30}$, $T_{40}$ and $T_{50}$), a depth $T_{Al}$ of the Al dispersed region, capacitor-temperature characteristics (X7R characteristics), TC bias characteristics, IR temperature dependency and specific permittivity ε were measured on each of the obtained capacitor samples respectively by methods explained below.

Rate of Al Content at Depth T ($T_5$, $T_{10}$, $T_{20}$, $T_{30}$, $T_{40}$ and $T_{50}$)

After processing a dielectric layer of the obtained capacitor sample to have a thickness of 10 μm, the sample was made furthermore thinner by ion milling. Then, a scanning transmission electronic microscope (TEM) was used to observe it to measure a rate of Al content at each depth T ($T_5$, $T_{10}$, $T_{20}$, $T_{30}$, $T_{40}$ and $T_{50}$).

Figure 5:
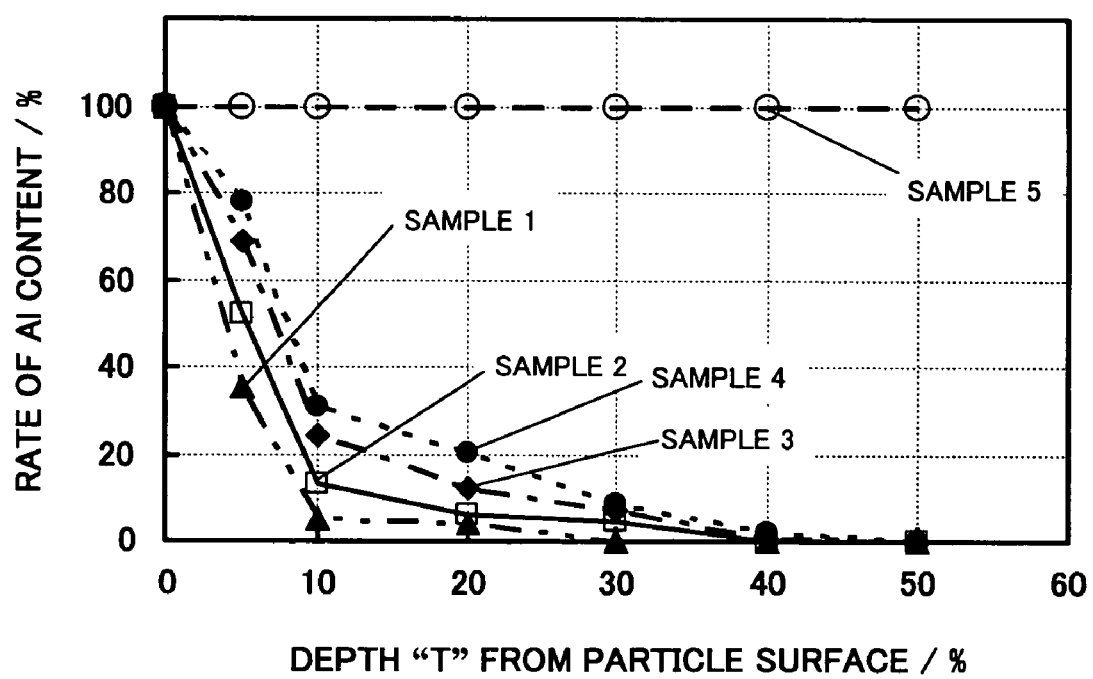
FIG. 5 is a graph showing a relationship of a depth T from a particle surface and a rate of content of Al in an example 1.

Specifically, line analysis was performed by TEM by using a straight line from end to end of the particle passing through an approximate center of the dielectric particle at each depth T ($T_5$, $T_{10}$, $T_{20}$, $T_{30}$, $T_{40}$ and $T_{50}$) shown in FIG. 4. Then, line analysis was performed on the same particle at each depth T by shifting the line by 90 degrees. The results are averaged, so that a rate of Al content at each depth T was measured. Note that, in the present example, a ratio of Al content at the crystal grain boundary was measured separately from the rate of Al content inside the dielectric particle, a rate of Al content at each depth T was calculated in percentage when assuming that a rate of Al content at the crystal grain boundary was 100%, and an evaluation was made thereon. The results are shown in FIG. 5 and Table 1.

Note that the depths $T_5$, $T_{10}$, $T_{20}$, $T_{30}$, $T_{40}$ and $T_{50}$ correspond to depths from the particle surface being 5%, 10%, 20%, 30%, 40% and 50% of the particle diameter D.

Depth $T_{Al}$ of Al Dispersed Region

In the same way as above, line analysis was performed by TEM by using a straight line from end to end of the particle passing through an approximate center of the dielectric particle. Then, line analysis was performed on the same particle by shifting the line by 90 degrees. The measurement results are averaged to obtain a depth $T_{Al}$ of the Al dispersed region. Note that, in the present embodiment, a region wherein a rate of Al content was 10 ppm or larger in weight ratio was considered as an Al dispersed region and evaluated. The results are shown in Table 1.

Capacity-Temperature Characteristics (X7R Characteristics)

The capacitor-temperature characteristics were evaluated by measuring capacitance in a temperature range of −55° C. to 125° C. on the obtained capacitor samples, calculating a change rate of the capacitance (ΔC/C, the unit is %) under a temperature environment of 125° C., at which the capacitor-temperature characteristics become worst in the temperature range, and checking whether the X7R characteristics (−55 to 125° C. and ΔC/C=within ±15%) were satisfied or not. Note that an LCR meter (4274A made by YHP) was used for measuring the capacitance, and the measurement was made under a condition of a frequency of 1 kHz and an input signal level of 1 Vrms. Those exhibited −15% or higher were evaluated good in the present example. The results are shown in Table 1.

TC Bias Characteristics

Figure 6:
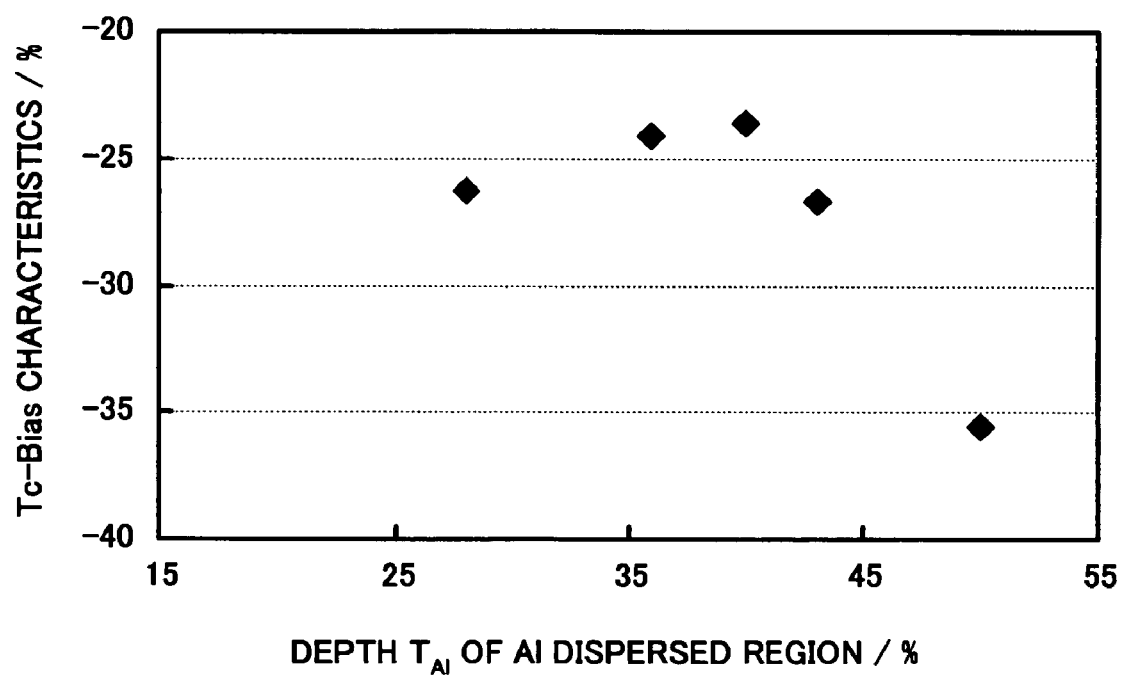
FIG. 6 is a graph showing a relationship of a depth $T_{Al}$ of an Al dispersed region and TC bias characteristics in the example 1.

The TC bias characteristics were measured on the obtained capacity samples by a digital LCR meter at 1 kHz, 1 Vrms and a bias voltage (direct current voltage) of 7.0 V/µm by changing the temperature from −55° C. to 150° C., and the change rate of the capacitance (the unit is %) from a measured value in a state where a bias voltage is not applied at 25° C. was calculated and evaluated. Note that an LCR meter was used for measuring the capacitance under the condition of a frequency of 1 kHz and an input signal level of 1 Vrms. The closer to 0% the TC bias characteristics is, the more preferable, and those exhibited −30% or higher were evaluated good in the present example. The results are shown in FIG. 6 and Table 1.

IR Temperature Dependency

Figure 7:
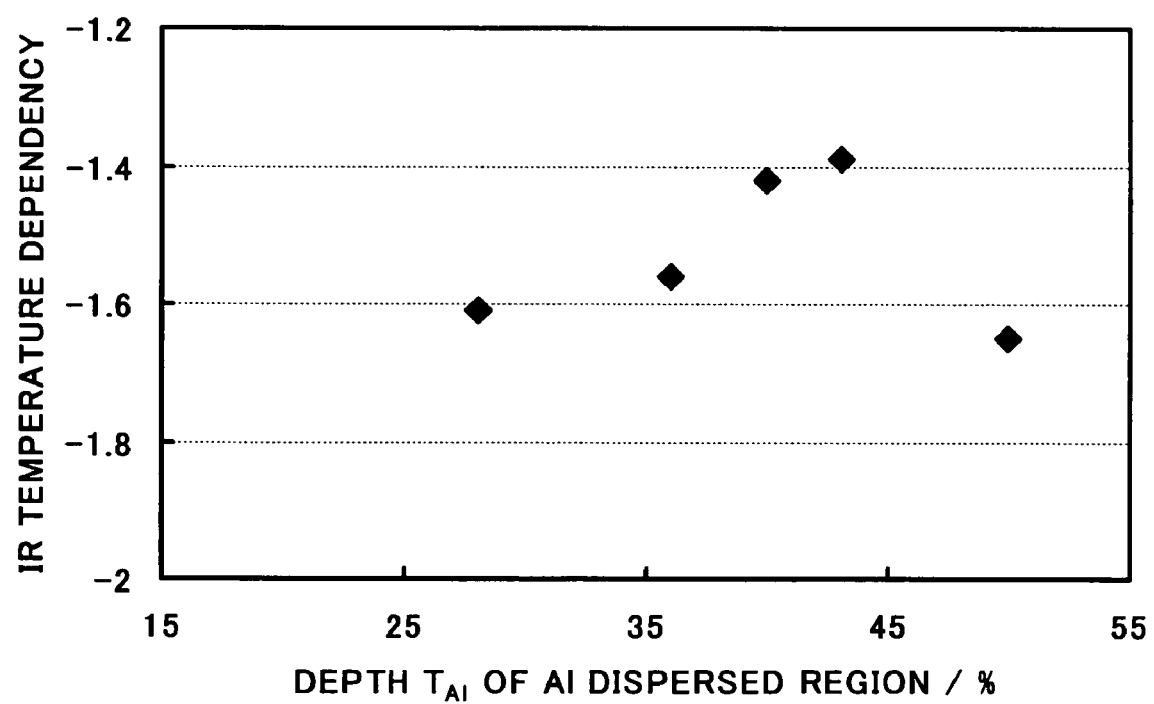
FIG. 7 is a graph showing a relationship of a depth $T_{Al}$ of an Al dispersed region and IR temperature dependency in the example 1.

IR temperature dependency (a loss of significant digits) was evaluated by measuring insulation resistance $IR_{150}$ at 150° C. and insulation resistance $IR_{25}$ at 25° C. of the obtained capacitor samples and calculating a loss of significant digits expressed by the formula (1) below. In the present example, −2.00 or higher was evaluated good. The results are shown in FIG. 7 and Table 1.

$$\log(IR_{150}/IR_{25}) \quad (1)$$

Note that measurement of insulation resistance at respective temperatures was made by using a temperature variable IR measuring device at a measurement voltage of 7.0 V/µm and voltage application time of 60s.

Specific Permittivity ϵ

The specific permittivity ϵ (no unit) of the obtained capacitor samples was calculated from capacitance measured under a condition of the reference temperature of 25° C. by using a digital LCR meter (4274A made by YHP), a frequency of 1 kHz and an input signal level (measurement voltage) of 1.0 Vrms. All samples in the present example exhibited a preferable result of 1000 or higher.

TABLE 1

| Sample No. | | Rate of Al Content at Respective Depths T* [%] | | | | | | Depth $T_{Al}$ of Al Dispersed Region [%] | Capacitor Temperature Characteristics [%] | TC-Bias [%] | IR Temperature Dependency [%] |
|---|---|---|---|---|---|---|---|---|---|---|---|
| | | $T_5$ | $T_{10}$ | $T_{20}$ | $T_{30}$ | $T_{40}$ | $T_{50}$ | | | | |
| 1 | Example | 35.4 | 5.3 | 3.8 | 0 | 0 | 0 | 28 | −8.9 | −26.3 | −1.61 |
| 2 | Example | 52.3 | 13.4 | 6.1 | 4.7 | 0 | 0 | 36 | −10.1 | −24.1 | −1.56 |
| 3 | Example | 69.1 | 24.1 | 12.4 | 7.1 | 0.3 | 0 | 40 | −12.4 | −23.6 | −1.42 |
| 4 | Example | 78.1 | 31.1 | 20.3 | 8.7 | 2.1 | 0 | 43 | −14.2 | −26.7 | −1.39 |
| 5 | Comparative Example | 100 | 100 | 100 | 100 | 100 | 100 | 50 | −23.5 | −35.6 | −1.65 |

*Note that rates of Al content at respective depths are on an assumption that rate of Al content at crystal grain boundary is 100%.

Table 1 shows the measurement results of rates of Al content at respective depths T ($T_5$, $T_{10}$, $T_{20}$, $T_{30}$, $T_{40}$ and $T_{50}$), depths $T_{Al}$ of an Al dispersed region, capacitor-temperature characteristics (X7R characteristics) at 125° C., TC bias characteristics and IR temperature dependency of the samples 1 to 5.

From Table 1, the samples 1 to 4 were confirmed to have the configuration that the rates of Al content in the dielectric particles become lower from the particle surface to inside thereof. Particularly, it is also obvious from FIG. 5 showing a graph of the rates of Al content at the depths T ($T_5$, $T_{10}$, $T_{20}$, $T_{30}$, $T_{40}$ and $T_{50}$).

Also, all of the samples 1 to 4 exhibited capacitor-temperature characteristics of −15% or higher, that is, satisfied the X7R characteristics, TC bias characteristics of −30% or higher and, furthermore, IR temperature dependency of −2.00 or higher, which were preferable results.

On the other hand, the sample 5, wherein Al uniformly dispersed entirely in the dielectric particles, exhibited capacitor-temperature characteristics not satisfying the X7R characteristics and poor results in TC bias characteristics and IR temperature dependency, as well.

From the results, it was confirmed that due to the configuration that a rate of Al content in the dielectric particles became lower from the particle surface to inside thereof, the TC bias characteristics and IR temperature dependency could be improved while satisfying the X7R characteristics.

Note that, from FIG. 6 showing a graph of a relationship of a depth $T_{Al}$ of an Al dispersed region and TC bias characteristics, it can be confirmed that as the depth $T_{Al}$ of the Al dispersed region becomes deeper, the TC bias characteristics improve along therewith to a certain depth, then, the TC bias characteristics abruptly declines. Also, the fact that the IR temperature dependency also exhibits the same tendency can be confirmed from FIG. 7 showing a graph of a relationship of a depth $T_{Al}$ of the Al dispersed region and IR temperature dependency.

Example 2

In the example 2, multilayer ceramic capacitor samples corresponding to the second embodiment (the X8R characteristics) were produced and evaluated.

First, 100 moles of $BaTiO_3$ as a main component material and 1.0 mole of $Al_2O_3$ were prepared. Next, these materials were mixed to obtain powder before calcining, and calcining is performed thereon under the condition below, so as to obtain five different kinds of powders calcined at different temperatures (corresponding to samples 6 to 10 in Table 2).

Calcining temperature: temperatures between 700 and 1000° C.

Calcining time: two hours

Note that the calcining temperatures of the samples 6 to 10 in the example 2 correspond to those of the samples 1 to 5 in the example 1.

Next, the obtained preliminarily fired powders were pulverized, added with subcomponents below, wet mixed by a ball mill for 16 hours and dried to obtain dielectric materials (dielectric ceramic composition powders).

$MgCO_3$ (the first subcomponent): 0.36 mole
$(Ba_{0.6}Ca_{0.4})SiO_3$ (the second subcomponent): 3.0 moles
$V_2O_5$ (the third subcomponent): 0.1 mole
$Yb_2O_3$ (the fourth subcomponent): 2.19 moles
$CaZrO_3$ (the fifth subcomponent): 1.2 mole
$Y_2O_3$ (the sixth subcomponent): 2.4 moles
$MnCO_3$ (the seventh subcomponent): 0.15 mole Note that each adding quantity of the subcomponents above is expressed by number of moles with respect to 100 moles of the main component in terms of each oxide. However adding quantities of the fourth subcomponent and sixth subcomponent are expressed by numbers of moles in terms of a Yb element and a Y element not in terms of $Yb_2O_3$ and $Y_2O_3$.

Then, by using the obtained dielectric material, dielectric layer paste was obtained in the same way as that in the example 1.

Also, an internal electrode layer paste was obtained by the same method as that in the example 1.

By using these pastes, in the same way as that in the example 1, multilayer ceramic chip capacitors 1 as shown in FIG. 1 were produced. In the example 2, samples 6 to 10 were obtained by changing the calcining temperature in a range of 700 to 1000° C.

Then, a rate of Al content at each depth T ($T_5$, $T_{10}$, $T_{20}$, $T_{30}$, $T_{40}$ and $T_{50}$), a depth $T_{Al}$ of the Al dispersed region, TC bias characteristics, IR temperature dependency and specific permittivity ε were measured on each of the obtained capacitor samples in the same ways as those in the example 1. Also, in addition to these characteristics, capacitor-temperature characteristics at 150° C. (X8R characteristics) were measured by the method explained below.

Capacity-Temperature Characteristics (X8R Characteristics)

The capacitor-temperature characteristics were evaluated by measuring capacitance in a temperature range of −55° C. to 150° C. on the obtained capacitor samples, calculating a change rate of the capacitance (ΔC/C, the unit is %) under a temperature environment of 150° C., at which the capacitor-temperature characteristics become worst in the temperature range, and checking whether the X8R characteristics (−55 to 150° C. and ΔC/C=within ±15%) were satisfied or not. Note that an LCR meter (4274A made by YHP) was used for measuring the capacitance, and the measurement was made under a condition of a frequency of 1 kHz and an input signal level of 1 Vrms. Those exhibited −15% or higher were evaluated good in the

TABLE 2

| Sample No. | | Rate of Al Content at Respective Depths T* [%] | | | | | | Depth $T_{Al}$ of Al Dispersed Region [%] | Capacitor Temperature Characteristics [%] | TC-Bias [%] | IR Temperature Dependency [%] |
| --- | --- | --- | --- | --- | --- | --- | --- | --- | --- | --- | --- |
| | | $T_5$ | $T_{10}$ | $T_{20}$ | $T_{30}$ | $T_{40}$ | $T_{50}$ | | | | |
| 6 | Example | 34.1 | 5 | 3.4 | 0 | 0 | 0 | 27 | −12.3 | −28.7 | −1.87 |
| 7 | Example | 51.1 | 13 | 5.8 | 4.5 | 0 | 0 | 35 | −13.5 | −26.5 | −1.67 |
| 8 | Example | 67.1 | 23 | 11.3 | 6.5 | 0 | 0 | 39 | −14.1 | −25.3 | −1.76 |
| 9 | Example | 77.8 | 30 | 19.9 | 8 | 2.1 | 0 | 44 | −14.5 | −24.1 | −1.87 |
| 10 | Comparative Example | 100 | 100 | 100 | 100 | 100 | 100 | 50 | −34.1 | −45.6 | −2.31 |

*Note that rates of Al content at respective depths are on an assumption that rate of Al content at crystal grain boundary is 100%.

Table 2 shows measurement results of rates of Al content at respective depths T ($T_5$, $T_{10}$, $T_{20}$, $T_{30}$, $T_{40}$ and $T_{50}$), depths $T_{Al}$ of an Al dispersed region, capacitor-temperature characteristics (X8R characteristics), TC bias characteristics and IR temperature dependency of the samples 6 to 10.

Note that, in the example 2, all samples i exhibited a preferable result of 1000 or higher in the specific permittivity ε.

Figure 8:
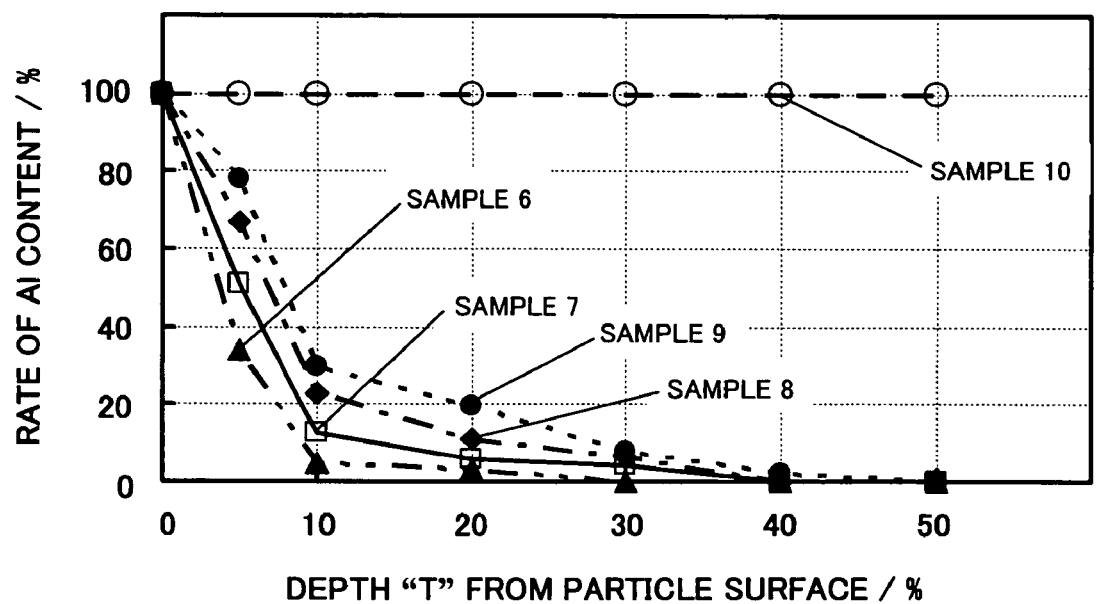
FIG. 8 is a graph showing a relationship of a depth T from a particle surface and a rate of content of Al in an example 2.

From Table 2, the samples 6 to 9 were confirmed to have the configuration that the rates of Al content in the dielectric particles become lower from the particle surface to inside thereof. Particularly, it is also obvious from FIG. 8 showing a graph of the rates of Al content at the depths T ($T_5$, $T_{10}$, $T_{20}$, $T_{30}$, $T_{40}$ and $T_{50}$).

Also, all of the samples 6 to 9 exhibited capacitor-temperature characteristics of −15% or higher, that is, satisfied the X8R characteristics, TC bias characteristics of −30% or higher and, furthermore, IR temperature dependency of −2.00 or higher, which were preferable results.

On the other hand, the sample 10, wherein Al uniformly dispersed entirely in the dielectric particles, exhibited capacitor-temperature characteristics not satisfying the X8R characteristics and poor results in TC bias characteristics and IR temperature dependency, as well.

From the results, it was confirmed that due to the configuration that a rate of Al content in the dielectric particles became lower from the particle surface to inside thereof, the IR temperature dependency could be improved while satisfying the X8R characteristics and, furthermore, by setting the depth $T_{Al}$ of the Al dispersed region to be in the preferable range of the present invention, the TC bias characteristics could be improved.

Figure 9:
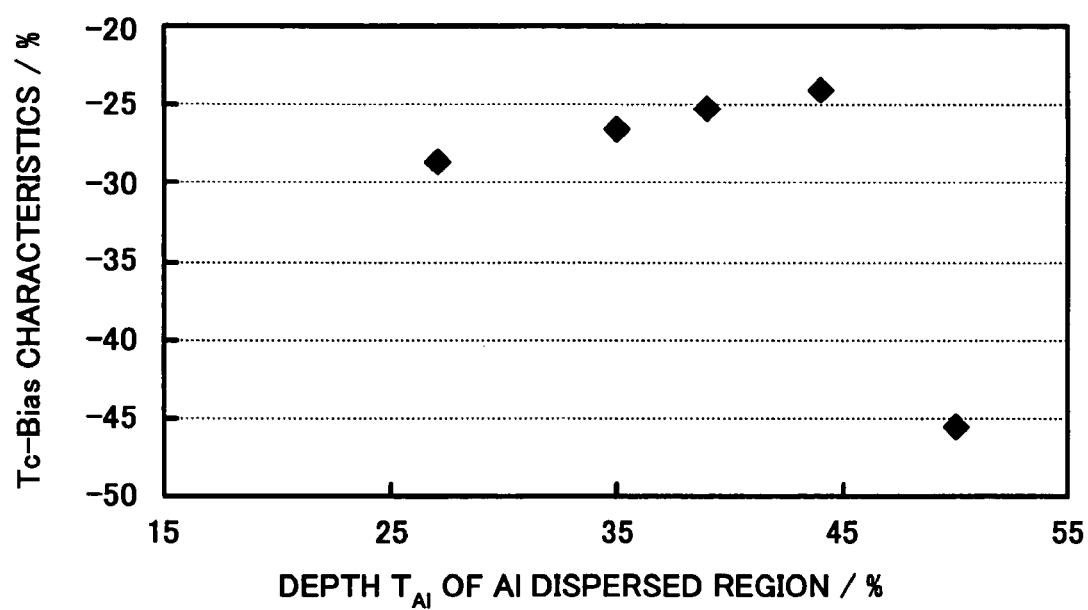
FIG. 9 is a graph showing a relationship of a depth $T_{Al}$ of an Al dispersed region and TC bias characteristics in the example 2.
Figure 10:
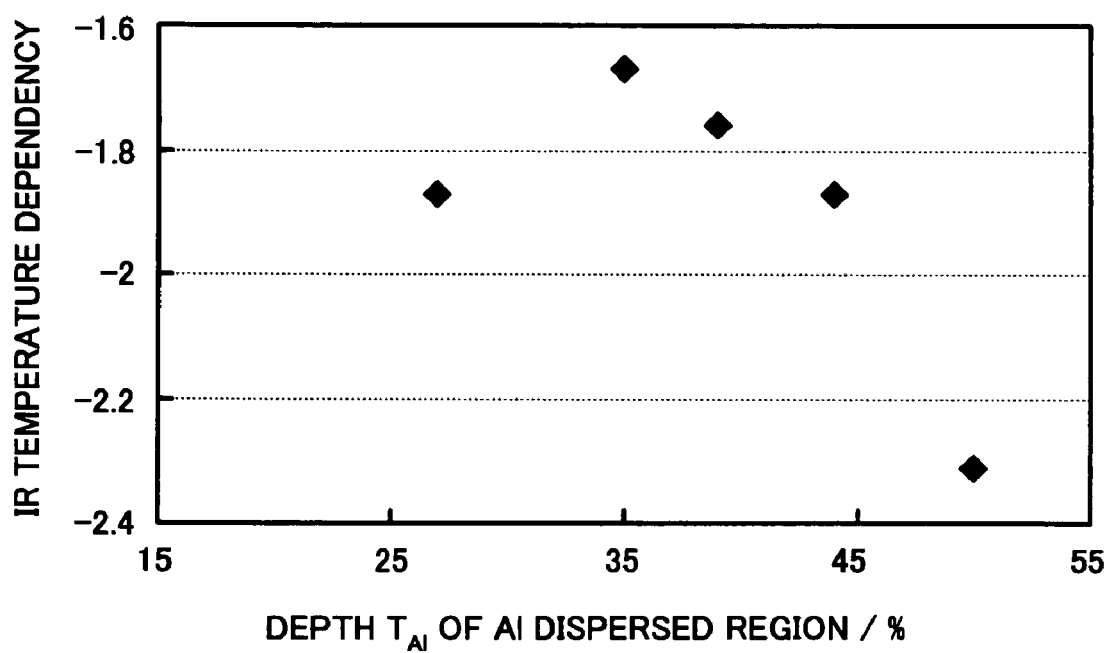
FIG. 10 is a graph showing a relationship of a depth $T_{Al}$ of an Al dispersed region and IR temperature dependency in the example 2.

Note that, from FIG. 9 showing a graph of a relationship of a depth $T_{Al}$ of an Al dispersed region and TC bias characteristics, it can be confirmed that as the depth $T_{Al}$ of the Al dispersed region becomes deeper, the TC bias characteristics improve along therewith to a certain depth, then, the TC bias characteristics abruptly declines. Also, the fact that the IR temperature dependency also exhibits the same tendency can be confirmed from FIG. 10 showing a graph of a relationship of a depth $T_{Al}$ of the Al dispersed region and IR temperature dependency.

Example 3

Other than changing the calcining condition for performing calcining on $BaTiO_3$ and $Al_2O_3$, capacitor samples 11 to 14 were produced in the same way as that in the example 2 and evaluation was made in the same way as in the example 2.

Namely, calcining was performed under the condition below in the example 3.

Calcining temperature: 700° C.
Calcining time: 2 to 20 hours

Note that the calcining time was 4 hours in the sample 11, 6 hours in the sample 12, 8 hours in the sample 13 and 20 hours in the sample 14. Note that the sample 6 shown in Table 3 below is the same sample as the sample 6 in the example 2 (preliminarily fired for 2 hours).

Note that, in the example 3, all samples exhibited a preferable result of 1000 or higher in the specific permittivity ε.

From Table 3, the samples 6 and 11 to 14 were confirmed to have the configuration that the rates of Al content in the dielectric particles become lower from the particle surface to inside thereof. Also, all of the samples 6 and 11 to 14 exhibited capacitor-temperature characteristics of −15% or higher, that is, satisfied the X8R characteristics, TC bias characteristics of −30% or lower and, furthermore, IR temperature dependency of −2.00 or higher, which were preferable results.

On the other hand, the sample 14 as a reference example had the configuration that the rate of Al content in the dielectric particles became lower from the particle surface to inside thereof, but Al was included also at a depth $T_{50}$, that is, the center portion of the dielectric particles. This sample 14 exhibited capacitor-temperature characteristics of not satisfying the X8R characteristics and poor results in TC bias characteristics and IR temperature dependency, as well.

From the results, it was confirmed that by configuring that a rate of Al content in the dielectric particles became lower from the particle surface to inside thereof and, furthermore, by substantially not including Al at the center portion of the dielectric particles, the TC bias characteristics and the IR temperature dependency could be improved while satisfying the X8R characteristics.

What is claimed is:

1. A dielectric ceramic composition comprising a main component including barium titanate;
an oxide of Al;
a first subcomponent being at least one of MgO, CaO, BaO, SrO and $Cr_2O_3$;
a second subcomponent including oxide silicon as a main component;
a third subcomponent being at least one of $V_2O_5$, $MoO_3$ and $WO_3$;
a fifth subcomponent including $CaZrO_3$ or $CaO+ZrO_2$;
a sixth subcomponent including an oxide of R2, where R2 is selected from Y, Dy, Ho, Tb, Gd and Eu; and
a seventh subcomponent including MnO;
wherein ratios of the respective subcomponents with respect to 100 moles of said main component are
first subcomponent: 0.1 to 3 moles,
second subcomponent: 2 to 10 moles,
third subcomponent: 0.01 to 0.5 mole,

TABLE 3

| Sample No. | | Rate of Al Content at Respective Depths T* [%] | | | | | | Depth $T_{Al}$ of Al Dispersed Region [%] | Capacitor Temperature Characteristics [%] | TC-Bias [%] | IR Temperature Dependency [%] |
|---|---|---|---|---|---|---|---|---|---|---|---|
| | | $T_5$ | $T_{10}$ | $T_{20}$ | $T_{30}$ | $T_{40}$ | $T_{50}$ | | | | |
| 6 | Example | 34.1 | 5 | 3.4 | 0 | 0 | 0 | 27 | −12.3 | −28.7 | −1.87 |
| 11 | Example | 34.1 | 12.1 | 6.7 | 5.1 | 0 | 0 | 33 | −13.6 | −25.1 | −1.65 |
| 12 | Example | 51.1 | 27 | 16.5 | 8.9 | 1.2 | 0 | 41 | −14.4 | −24.1 | −1.59 |
| 13 | Example | 67.1 | 34 | 23.1 | 13.1 | 3.4 | 0 | 43 | −14.9 | −23.4 | −1.5 |
| 14 | Reference Example | 100 | 80 | 50 | 32 | 23 | 19 | 50 | −22.6 | −34.1 | −2.03 |

*Note that rates of Al content at respective depths are on an assumption that rate of Al content at crystal grain boundary is 100%.

Table 3 shows measurement results of rates of Al content at respective depths T ($T_5$, $T_{10}$, $T_{20}$, $T_{30}$, $T_{40}$ and $T_{50}$), depths $T_{Al}$ of an Al dispersed region, capacitor-temperature characteristics (X8R characteristics), TC bias characteristics and IR temperature dependency of the samples 6 and 11 to 14.

fifth subcomponent: larger than 0 mole but not larger than 5 moles,
sixth subcomponent: larger than 0 mole but not larger than 9 moles, wherein the number of moles of the sixth subcomponent is in terms of an R2 element, and seventh subcomponent: larger than 0 mole but not larger than 0.5 mole, said dielectric ceramic composition includes a plurality of dielectric particles; and concentration of Al in each of said dielectric particles becomes lower from a particle surface to inside thereof.

2. The dielectric ceramic composition as set forth in claim 1, wherein each of said dielectric particles has an Al non-dispersed region substantially not including Al at least at a center portion of the particle.

3. The dielectric ceramic composition as set forth in claim 2, wherein each of said dielectric particles has Al dispersed region substantially including Al dispersing from the particle surface to inside thereof; and when a particle diameter of said dielectric particle is D, a depth $T_{Al}$ of said Al dispersed region from the particle surface is 5 to 45% of said particle diameter D.

4. The dielectric ceramic composition as set forth in claim 3, wherein:

said dielectric ceramic composition has a plurality of said dielectric particles and crystal grain boundaries existing between said dielectric particles next to each other; and a rate of Al content at a depth $T_5$ as a depth from the particle surface being 5% of said particle diameter D is 20 to 80% when a rate of Al content at said crystal grain boundaries is 100%.

5. The dielectric ceramic composition as set forth in claim 1, wherein a content of an oxide of said Al is 0 to 4.0 moles, not including 0, with respect to 100 moles of said main component in terms of $Al_2O_3$.

6. The dielectric ceramic composition as set forth in claim 1, further comprising a fourth subcomponent including an oxide of R1, wherein R1 is at least one of Sc, Er, Tm, Yb and Lu;

wherein a content of said fourth subcomponent is 0.5 to 7 moles with respect to 100 moles of said main component in terms of an R1 element.

7. A production method of the dielectric ceramic composition as set forth in claim 1, comprising a step of performing calcining on a main component and at least a part of an oxide of Al to be included in said dielectric ceramic composition.

8. An electronic device comprising a dielectric layer composed of the dielectric ceramic composition as set forth in claim 1.

9. A multilayer ceramic capacitor comprising a capacitor element body obtained by alternately stacking dielectric layers composed of the dielectric ceramic composition as set forth in claim 1 and internal electrode layers.

* * * * *